US009427007B2

(12) United States Patent
Mason et al.

(10) Patent No.: US 9,427,007 B2
(45) Date of Patent: Aug. 30, 2016

(54) MULTIPLE EMULSIONS FOR COLORANTS

(75) Inventors: Sarah Louise Mason, Virum (DK); Marie Bonnet, Castelnau le Lez (FR)

(73) Assignee: Chr. Hansen Natural Colors A/S, Hoersholm (DK)

( * ) Notice: Subject to any disclaimer, the term of this patent is extended or adjusted under 35 U.S.C. 154(b) by 64 days.

(21) Appl. No.: 13/881,633

(22) PCT Filed: Nov. 4, 2011

(86) PCT No.: PCT/EP2011/069449
§ 371 (c)(1),
(2), (4) Date: May 1, 2013

(87) PCT Pub. No.: WO2012/059590
PCT Pub. Date: May 10, 2012

(65) Prior Publication Data
US 2013/0216665 A1 Aug. 22, 2013

(30) Foreign Application Priority Data
Nov. 5, 2010 (EP) .................................... 10190127

(51) Int. Cl.
*A23L 1/27* (2006.01)
*C12C 5/04* (2006.01)
*A23P 1/00* (2006.01)
*A23D 7/00* (2006.01)
*A23D 9/00* (2006.01)
*A21D 2/16* (2006.01)
*A23L 1/275* (2006.01)
(Continued)

(52) U.S. Cl.
CPC ................ *A23L 1/2753* (2013.01); *A23L 1/27* (2013.01); *A23L 2/58* (2013.01); *A23D 9/00* (2013.01); *A23D 9/013* (2013.01); *A23V 2002/00* (2013.01)

(58) Field of Classification Search
CPC .......... A23L 1/27; A23L 2/58; A23L 1/2753; A23L 1/275; A23L 1/2751; A23V 2002/00; A23V 2200/04; A23D 9/00; A23D 9/013
USPC .......................... 426/250, 519, 540, 602, 601
See application file for complete search history.

(56) References Cited

U.S. PATENT DOCUMENTS 4,254,105 A 3/1981 Fukuda
6,261,541 B1 7/2001 Karpov et al.
(Continued)

FOREIGN PATENT DOCUMENTS

EP 997075 A1 * 5/2000
JP 60-034155 A 2/1985
(Continued)

OTHER PUBLICATIONS

Naz,. "Food Chemistry". Available online at www.feingold.org on Jul. 15, 2007.*
Horst, et al. "Double emulsions control release or separate food components", Voedingsmiddelentechnologie, vol. 32, No. 24, 1999, pp. 10-16.
(Continued)

*Primary Examiner* — Erik Kashnikow
*Assistant Examiner* — Assaf Zilbering
(74) *Attorney, Agent, or Firm* — Foley & Lardner LLP

(57) ABSTRACT

The present invention is related to a multiple emulsion of the water-in-oil-in-water (W/O/W) type for stabilization of natural coloring agents, such as anthocyanin, phycocyanin, *carthamus*, huito, calcium carbonate, carmine and carminic acid, against changes in pH values, oxidation and light as well as against ingredient interactions.

14 Claims, 7 Drawing Sheets

(51) Int. Cl.
*A23L 2/58* (2006.01)
*A23D 9/013* (2006.01)

(56) References Cited

U.S. PATENT DOCUMENTS

2004/0101613 A1  5/2004  Levi
2010/0099639 A1  4/2010  Terao et al.

FOREIGN PATENT DOCUMENTS

| JP | 62-244370 A | 10/1987 |
| WO | WO-2008/021531 A2 | 2/2008 |
| WO | WO-2008/032006 A1 | 3/2008 |

OTHER PUBLICATIONS

International Search Report in PCT/EP2011/069449 dated Dec. 6, 2011.
Rodriguez-Huezo, et al. "Microencapsulation by Spray Drying of Multiple Emulsions Containing Carotenoids", Journal of Food Science, vol. 69, No. 7, 2004, pp. E351-E359.
Defining Color—Systems for precise color validation; Jan. 1, 2007; [online] Retrieved from the Internet Jan. 22, 2016: <URL: https://www.pantone.com/downloads/articles/pdfs/L10_315_Defining_color_munsell_en.pdf> 24 pages; Munsell Color.
English translation of JP 62-244370 published Oct. 24, 1987; 4 pages.

* cited by examiner

A

B

A

B

MULTIPLE EMULSIONS FOR COLORANTS

CROSS-REFERENCE TO RELATED APPLICATIONS

This application is a National Phase of International Application PCT/EP2011/069449, filed Nov. 4, 2011, which was published on May 10, 2012, as WO 2012/059590, which claims the benefit of EP Application No. 10190127.0, filed Nov. 5, 2010, all of which are incorporated herein by reference in their entirety.

FIELD OF THE INVENTION

The present invention relates to a multiple emulsion having the form of a water-in-oil-in-water (W/O/W) multiple emulsion which may be used for the stabilization of natural coloring agents, such as anthocyanins, phycocyanin from *Spirulina*, safflomin from *Carthamus*, carmine and carminic acid, against changes in factors such as pH value, oxidation and light as well as ingredient interactions and temperature fluctuations.

Furthermore, the present invention relates to a process for preparing a W/O/W multiple emulsion type colorant comprising a natural coloring agent in the internal aqueous phase and to methods for coloring of products, such as foodstuffs, pharmaceuticals and cosmetics, using a W/O/W multiple emulsion type colorant.

TECHNICAL BACKGROUND AND PRIOR ART

Water-in-oil-in-water (W/O/W) multiple emulsions, or double emulsions, are emulsion systems where small water droplets are entrapped within larger oil droplets that in turn are dispersed in a continuous water phase. Multiple emulsions find many applications in industries such as food, pharmaceuticals and cosmetics by enclosing useful substances inside the small water droplets.

Multiple emulsions, either W/O/W or O/W/O emulsions, are generally prepared using a 2-step procedure. For W/O/W emulsions, first, a water-in-oil (W/O) emulsion is formed by blending a first (internal) aqueous phase and an oil phase together in the presence of a suitable oil-soluble (e.g. low hydrophile-lipophile balance (HLB) number) emulsifier. This emulsifier adsorbs to the surface of the water droplets and forms a protective coating that prevents their subsequent aggregation. Furthermore, the emulsifier reduces the interfacial tension between the oil and the water phase, favouring the formation of droplets, and increasing the stability of emulsions. Second, a W/O/W emulsion is formed by homogenizing the W/O emulsion with a second (external) aqueous phase containing a suitable water-soluble (e.g. high HLB number) emulsifier. This emulsifier adsorbs to the surface of the oil droplets and forms a protective coating that prevents their subsequent aggregation. The emulsifier also reduces the interfacial tension between the water and the oil phase, favoring the formation of droplets, and increasing the stability of emulsions. The first step is usually carried out in a high-shear device to produce very fine droplets. The second emulsification step is carried out in a low-shear device to avoid rupturing the multiple droplets.

Several publications relate to the process of preparing W/O/W multiple emulsions:

Fukuda (U.S. Pat. No. 4,254,105) describes a multiple emulsion having a dispersing form of W/O/W and a process for preparation thereof for cosmetics.

McClements et al. (WO 2008/021531) is directed to multi-phase emulsion compositions comprising in a first aqueous phase a biopolymeric gelling component.

Terao et al. (US 2010/0099639) relates to W/O/W multiple emulsion composition containing in an internal aqueous phase an ionic physiologically active substance and a physiologically acceptable compound having a molecular weight of 1,000 or less and generating a polyvalent counterion with two or more valencies for the ionic physiologically active substance.

Rodriquez-Huezo et al. (2004. J Food Science 69(7); E351-E359) is directed to formation of microcapsules containing water and oil soluble carotenoids by spray-drying of W/O/W multiple emulsions.

JP 62244370 describes a W/O/W multiple emulsion comprising an essential oil extracted from citrus fruit peel as the oil phase and an aqueous solution containing water-soluble pigments as the internal aqueous phase.

JP 60 034155 relates to W/O/W type multiple emulsion containing water soluble pigment in an internal aqueous solution.

Due to consumer preferences synthetic food colorants are steadily being replaced by natural ones. However, in comparison with the natural coloring agents, the synthetic coloring agents show greater resistance and stability when exposed to oxidation, changes in temperature, pH and other factors.

Anthocyanins (polyphenolic pigments) are natural, water-soluble, nontoxic pigments displaying a variety of colors from orange to blue. Anthocyanin-rich extracts from fruits and vegetables can be used as food colorants.

Van den Horst and Langelaan (1999) analyzed the separation of the aroma and color compounds of red cabbage concentrate in multiple emulsions.

However, the main drawback in the use of anthocyanins as food colorants is their low stability. In fact, the color stability of anthocyanins depends on a combination of factors: structure and concentration of anthocyanins, pH, temperature, and presence of complexing agents (phenols, metal ions) (Markakis, P. Stability of anthocyanins in foods. In *Anthocyanins as Food Colors*; Markakis, P., Ed.; Academic Press: New York (1982); pp 163-180.). Anthocyanins are stable red-colored compounds when the pH of the bulk medium is around 4. At pH 6-7, which is typical of many foods including milk products, anthocyanins are no longer red but instead violet-blue. Since the color of anthocyanins changes with pH, it can be challenging to achieve a red color in many pH-neutral foods using anthocyanins.

Phycocyanin is a blue protein complex found in blue-green algae of the cyanobacterium species *Spirulina*, in particular *Spirulina platensis*. Phycocyanin is a phycobiliprotein, an oligomeric protein with the linear tetrapyrrole chromophores known as bilins covalently attached to the apoprotein by a thioether linkage. Biliproteins are found assembled in large, distinct granules—phycobilisomes—that are considered analogous to the light-harvesting complexes containing chlorophyll a and b in green plants. The molecular weight and the position and intensity of the absorption maximum of phycocyanin depend on the state of aggregation, which is further influenced by parameters such as solution pH, temperature, protein concentration and algae origin. Phycocyanin is unstable to heat and light in aqueous solution (Jespersen, L, Strømdahl, L. D., Olsen, K., Skibsted, L. H.; Eur Food Res Technol (2005); 220:261-266). *Spirulina* pigments give an attractive, bright blue color but precipitate at low pH, limiting their usage to beverages and some confectionary applications.

Carminic acid is the free coloring principle extracted from the female cochineal insects *Dactylopius coccus costa* (*Coccus cacti* L.). It is a water-soluble natural color that is orange at low pH (where it is most stable), purple at neutral pH, and blue at alkaline pH. Carmine is the aluminum or calcium-aluminum lake of carminic acid on an aluminum hydroxide substrate. It is dispersible but not soluble in water, although it can be dissolved in acidic or alkaline solutions.

Calcium carbonate is a white powder which dissolves at low pH in liquid products and thereby loses its coating properties. This can be a problem in low pH jelly gums where a white product is needed without the use of titanium dioxide. Dissolving of calcium carbonate can also cause confectionery coated with anthocyanins to turn from red to blue by increasing the pH.

Huito pigments are derived from stabilized and concentrated juices of the *Genipa americana*, an edible fruit. As with the other pigments, double encapsulation can help protect the huito from ingredients in the matrix that might cause its precipitation, and allow the inclusion of antioxidants to protect the pigment.

*Carthamus* is a dark yellow natural flavoring preparation or natural food ingredient produced by aqueous extraction of *carthamus* or safflower (*Carthamus tinctorius* L.). The preparation contains flavorings, pigments, and other ingredients from the plant, so has a typical aroma and flavor profile for safflower concentrate. Double encapsulation can reduce the flavor and aroma profile from this pigment.

The coloring agents mentioned herein are water-dispersible, i.e. they can be readily dissolved or dispersed in an aqueous medium as shown in the Examples herein, which allow for them to be encapsulated in a W/O/W multiple emulsion.

Other water-dispersible pigments not mentioned herein could potentially benefit from an encapsulation technology, for example to control their antioxidant environment.

The natural coloring agents are especially useful as colorants for food products, such as confectionary, fruit preparation, ice cream and dairy. However, their instability at different pH makes use of them difficult.

Additionally, the natural coloring agents may experience fading when subjected to light for an extended time period.

For fruit preparation a specific problem arises when the fruit preparation is layered with yoghurt or white mass; the color from the fruit preparation migrates into the yoghurt.

There is, thus, a continuous industrial need for alternative methods for coloring food products, cosmetics and pharmaceutical products with natural water-dispersible coloring agents as colorant and for methods to render these coloring agents more stable to external factors during use.

SUMMARY OF THE INVENTION

It is an object of the present invention to provide means for stabilizing and protecting water-dispersible natural coloring agents, such as phycocyanin (from *Spirulina*), carmine, carminic acid, safflomin and anthocyanin, towards factors such as changes in pH levels, oxidation, light, ingredient interactions and temperature fluctuations.

Another object of the present invention is the provision of a natural colorant wherein the natural coloring agent remains stable during periods of prolonged storage and during use of the colorant for coloring of edible products.

Additionally, it is an object of the present invention to provide a method for coloring edible products, such as foodstuffs and beverages, with a stable W/O/W multiple emulsion type colorant comprising an internal aqueous phase comprising a water-dispersible coloring agent.

Other objects, features, benefits and advantages of the present invention will be apparent from the summary and the following description and will be readily apparent to those skilled in the art.

The inventors of the present invention have found that by encapsulating water-dispersible natural coloring agents in the internal phase of a W/O/W emulsion the coloring agents were protected against changes in pH as shown in the Examples herein.

In addition, the W/O/W emulsion proved to stabilize the natural coloring agents against other changes in the environment such as light exposure and ingredient interactions.

In a first aspect the present invention provides a W/O/W multiple emulsion type colorant comprising an internal aqueous phase, an oil phase, and an external aqueous phase, the internal aqueous phase comprising at least one water-dispersible coloring agent.

In a preferred embodiment the at least one water-dispersible coloring agent is a water-dispersible natural coloring agent with the proviso that the water-dispersible natural coloring agent is not red cabbage anthocyanins In a second aspect the present invention provides a W/O/W multiple emulsion type colorant comprising
 a) an internal aqueous phase comprising at least one water-dispersible natural coloring agent, wherein the water-dispersible natural coloring agent is selected from the group consisting of phycocyanin, carmine, carminic acid and anthocyanin. In another preferred embodiment the coloring agent is phycocyanin.
 b) An oil phase comprising an oil-soluble emulsifier, and
 c) An external aqueous phase comprising a water-soluble emulsifier.

In a preferred embodiment the coloring agent is carmine, preferably a carmine lake. In another preferred embodiment the coloring agent is carminic acid. And in another preferred embodiment the coloring agent is anthocyanin.

A third aspect relates to a method for preparing a W/O/W multiple emulsion type colorant according to the first or second aspect of the invention; the method comprising the steps:
 a) mixing the at least one water-dispersible coloring agent with water to form a first aqueous solution,
 b) mixing an oil component with the suitable oil-soluble emulsifier to form an oil solution
 c) mixing a second aqueous solution with the suitable water-soluble emulsifier to form a second aqueous solution,
 d) mixing or homogenizing the first aqueous solution and the oil solution together to create a W/O emulsion, and
 e) mixing or homogenizing the W/O emulsion with the second aqueous solution to create the W/O/W multiple emulsion type colorant.

A fourth aspect of the present invention relates to a method for coloring edible products, such as food- and feedstuffs or pharmaceutical products, the method comprising the steps of providing an edible product, and incorporating into the edible product the W/O/W multiple emulsion type colorant according to the first or second aspect of the invention.

In a fifth aspect the present invention is directed to a food composition comprising the W/O/W multiple emulsion type colorant according to the first or second aspect of the invention.

A sixth aspect of the present invention relates to a beverage composition comprising the W/O/W multiple emulsion type colorant according to the first or second aspect of the invention.

In a seventh aspect the present invention is directed to use of a W/O/W multiple emulsion type colorant comprising at least one water-dispersible coloring agent in the internal aqueous phase for coloring of an edible product.

An eighth aspect of the present invention is directed to use of a W/O/W multiple emulsion type colorant according to the first or second aspect of the invention for coloring of an edible product.

DETAILED DISCLOSURE OF THE INVENTION

Figure 1:
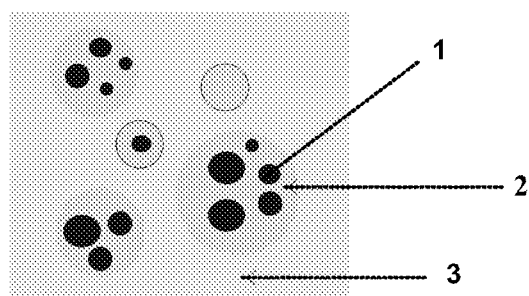
FIG. 1: Sketch showing a coloring agent dispersed as water-in-oil-in-water multiple emulsion. 1, Phycocyanin dissolved in water, dispersed as droplets; 2, Sunflower oil with Polyglycerol polyricinoleate (PGPR) oil-soluble emulsifier; 3, Water with Tween 20 water-soluble emulsifier.

The inventors of the present invention have surprisingly found that the stability of natural coloring agents can be increased by dispersing the water-dispersible coloring agents as W/O/W multiple emulsions. Especially, the pH stability of the natural coloring agents is increased considerably by encapsulation in a W/O/W multiple emulsion allowing for the resulting colorants to be used in a broader range of applications.

The W/O/W emulsions comprise an aqueous phase (internal aqueous phase) dispersed in an oil phase forming a water-in-oil emulsion. The water-in-oil emulsion is dispersed in an external aqueous phase.

Accordingly, a first aspect of the present invention relates to a W/O/W multiple emulsion type colorant comprising
 a) an internal aqueous phase comprising at least one water-dispersible coloring agent,
 b) an oil phase comprising an oil-soluble emulsifier, and
 c) an external aqueous phase comprising a water-soluble emulsifier.

By the term "water-dispersible" is meant a compound which can be distributed evenly throughout an aqueous medium, such as by dissolution or dispersion.

In a preferred embodiment the present invention relates to a W/O/W multiple emulsion type colorant comprising
 a) an internal aqueous phase comprising at least one water-dispersible natural coloring agent with the proviso that the at least one water-dispersible natural coloring agent is not red cabbage anthocyanins,
 b) an oil phase comprising an oil-soluble emulsifier, and
 c) an external aqueous phase comprising a water-soluble emulsifier.

In a second aspect the present invention relates to a W/O/W multiple emulsion type colorant comprising
 a) an internal aqueous phase comprising at least one water-dispersible natural coloring agent, wherein the at least one water-dispersible natural coloring agent is selected from the group consisting of phycocyanin, carmine, carminic acid, *carthamus*, huito, calcium carbonate, aronia anthocyanins, bilberry anthocyanins, black carrot anthocyanins, blackcurrant anthocyanins, cherry anthocyanins, elderberry anthocyanins, hibiscus anthocyanins, lingonberry anthocyanins, purple corn anthocyanins, red grape anthocyanins, red radish anthocyanins, sweet potato anthocyanins, Cu-chlorophyllin, red beet betalains, caramel, carbo vegetabilis and annatto,
 b) an oil phase comprising an oil-soluble emulsifier, and
 c) an external aqueous phase comprising a water-soluble emulsifier.

In a preferred embodiment the at least one water-dispersible natural coloring agent is selected from the group consisting of phycocyanin, carmine, carminic acid, *carthamus*, huito, calcium carbonate, aronia anthocyanins, bilberry anthocyanins, black carrot anthocyanins, blackcurrant anthocyanins, cherry anthocyanins, elderberry anthocyanins, hibiscus anthocyanins, lingonberry anthocyanins, purple corn anthocyanins, red grape anthocyanins, red radish anthocyanins and sweet potato anthocyanins.

Preferably, the at least one water-dispersible natural coloring agent is selected from the group consisting of phycocyanin, carminic acid, aronia anthocyanins, bilberry anthocyanins, black carrot anthocyanins, blackcurrant anthocyanins, elderberry anthocyanins, hibiscus anthocyanins, lingonberry anthocyanins, purple corn anthocyanins, red grape anthocyanins, red radish anthocyanins, and sweet potato anthocyanins.

In further preferred embodiments of the present invention two or more water-dispersible natural coloring agents are mixed together in the internal aqueous phase of the W/O/W multiple emulsion.

For the oil phase almost all animal fats and oils, vegetable fats and oils, mineral oils and waxes can be used for the formation of the W/O emulsion including but not limited to fatty acids (saturated or unsaturated), glycerols, glycerides and their respective derivatives, phospholipids and their respective derivatives, glycolipids, phytosterol and/or sterol esters (e.g. cholesterol esters, phytosterol esters and derivatives thereof), as may be required by a given food or beverage end use application.

Examples of saturated fatty acids that may be mentioned include palmitic acid, stearic acid and behenic acid.

Examples of unsaturated fatty acids that may be mentioned include myristoleic acid, palmitoleic acid, oleic acid, crucic acid, linoleic acid, linolenic acid, arachidonic acid and ricinoleic acid, and also mixtures thereof.

As organic oils of animal origin, mention may be made of sperm whale oil, whale oil, sardine oil, herring oil, shark oil, and cod liver oil; pig or sheep fat (tallow).

As waxes of animal origin, mention may be made of beeswax.

As examples of organic oils of plant origin, mentions may be made of rapeseed oil, sunflower oil, groundnut oil, olive oil, walnut oil, maize oil, soybean oil, linseed oil, hemp oil, grapeseed oil, coconut oil, palm oil, cottonseed oil, babassu oil, jojoba oil, sesame seed oil, castor oil, cocoa butter and shea butter.

As regards the mineral oils, mention may be made of naphthenic oils, paraffinic oils and polybutenes.

The paraffin waxes may similarly be suitable for preparing the emulsion.

The products derived from the alcoholysis of the above-mentioned oils or waxes may also be used.

The amount of the oil component to be added may be determined depending on e.g., the type of product to be manufactured, but its maximum amount will be determined by the maximum volume percentage of the W/O emulsion in the W/O/W multiple emulsion and also by the minimum volume percentage of the water phase in that W/O emulsion.

In a preferred embodiment the oil used for the W/O/W multiple emulsion type colorant is sunflower oil.

In another preferred embodiment the total amount of oil in the W/O/W multiple emulsion is in the range of from 10-30% by weight, such as about 15 to 25% by weight.

The oil-soluble emulsifier to be used for the formation of the W/O emulsion from the oil components described above should have such an appropriate HLB that the oil component used can form the dispersed phase of the W/O emulsion. Particularly, polyglycerol esters of fatty acids, such as polyglycerol polyricinoleate (PGPR), can be used as emulsifier. Other Examples of food-grade, oil-soluble emulsifiers which can be used include but is not limited to emulsifier Mono-Di Mor 50 (Danisco Ingredients), enzyme-modified soy lecithin (Cargill), sunflower lecithin (Cargill), lecithin (Cargill), glycerol monooleate, phospholipid, sorbitan ester and sucrose ester. The amount of oil-soluble emulsifier to be added varies depending on the types of the oil component and the oil-soluble emulsifier itself and is usually between 1-10% by weight of the amount of the oil component used. A combination of two or more oil-soluble emulsifiers may be used.

In a preferred embodiment of the present invention the oil-soluble emulsifier is polyglycerol polyricinoleate (PGPR).

The water phase to be dispersed in the oil component is an aqueous solution (distilled or deionized water) comprising one or more water-dispersible natural coloring agent.

In a preferred embodiment the water-dispersible natural coloring agent is selected from the group consisting of phycocyanin, carmine, carminic acid and anthocyanin. In another preferred embodiment the water-dispersible natural coloring agent is phycocyanin. In yet another preferred embodiment the water-dispersible natural coloring agent is carminic acid.

Preferably, the ratio of inner aqueous phase/oil phase is between about 20:80 and about 45:55 by weight, such as between about 25:75 and about 40:60 by weight.

The mixture of oil and water is homogenized using high pressure or shear or a membrane or ultrasound, by mixers known in the art. The homogenization speed and the duration of the shearing or mixing have an influence on the size of the water droplets inside the oil droplets, and thereby on the texture and consistency of the final multiple emulsion. The size of the water droplets influences the consistency of the final multiple emulsion and may be adjusted accordingly. Preferably, the conditions are such that the water droplets have a size between 10 nm and 20 µm. In a most preferred embodiment, the size of the water droplets is between 100 nm and 5 µm.

In accordance with one particularly advantageous embodiment, the inner aqueous phase may comprise at least one additive chosen from salts, for instance sodium chloride, calcium chloride or sodium sulphate or sugars, for instance glucose, or polysaccharides, especially such as dextran, or mixtures thereof.

The water-soluble emulsifier, or hydrophilic emulsifier, to be used in the present invention is an emulsifier having a HLB at which the aforementioned oil component can form the dispersed phase of the O/W emulsion. As the water-soluble emulsifier, surface active agents which have various ranges of HLB may be used. Examples of food-grade water-soluble emulsifiers include but is not limited to Citrem LR10® (Danisco Ingredients), Citrem N12-Veg® (Danisco Ingredients), Panodan TR® (Danisco Ingredients), Purity Gum 2000® (National Starch), Modified starch—waxy maize (National Starch), pre-gelatinized starch sodium octenyl suc (Cargill), Polysorbate 80 (Croda), sucrose ester (Sisterna), sucrose monoester (Compass Food), calcium caseinate Lacprodan (Arla Foods Ingredients), sodium caseinate, fish gelatine, cow gelatine, beta pectin type beta, proteins, polysaccharides and polyoxyethylene sorbitan fatty acid esters, such as polyoxyethylene sorbitan mono-oleate, polyoxyethylene sorbitan mono-laurate, polyoxyethylene sorbitan mono-stearate). The water-soluble emulsifier is dissolved in water to form an aqueous solution of the emulsifier. The amount of the emulsifier to be added varies depending on the type of the emulsifier used and other conditions, but its preferable range is about 1 to about 30% by weight of the aqueous phase, such as between about 1 to about 25% by weight of the aqueous phase.

In a preferred embodiment, the water-soluble emulsifier is selected from the group consisting of Polysorbate 80, calcium caseinate, Citrem N12-Veg®.

A viscosifier, such as starch, pectin, gum Arabic, locust bean gum, xanthan gum and carboxymethylcellulose, could be added in the external aqueous phase to favour the drop shearing Water-soluble molecules may further be included in the internal or in the external aqueous phase of the multiple emulsion.

Specifically, compounds for matching the osmotic balance, such as sugars, such as glucose, lactose and fructose, glycerol, proteins and electrolytes, such as salts, that can match the osmotic pressure from the internal to the external water phase can be added in the external aqueous phase (continuous phase). The aim is to maintain the compartmented structure of the multiple emulsions, reducing the water flows and the breakdown of the droplets.

The amount of external aqueous phase added to the water-in-oil emulsion is in the range of between 15:85 to 95:5. Preferably, it is in the range of between 20:80 to 80:20, More preferably, it is in the range of between 30:70 to 70:30.

The inventors of the present invention found that the color shade of the at least one water-dispersible natural coloring agent was stabilized by the W/O/W multiple emulsion to the color shade determined by the pH of the internal aqueous phase despite a pH gradient between the internal aqueous phase and the external aqueous phase (continuous phase).

Thus, as understood by the skilled person, it is within the present invention to adjust the pH of the internal aqueous phase to any pH suitable for achieving a desirable color shade of the at least one water-dispersible natural coloring agent.

In a much preferred embodiment of the first or second aspect of the present invention the pH of the internal aqueous phase is at the most 6.0, such as at the most 5.0, such as at the most 4.0, such as at the most 3.0, such as at the most 2.0.

In another preferred embodiment the pH gradient between the internal aqueous phase and the external aqueous phase is at least 1 pH unit, such as at least 2 pH units, such as at least 3 pH units, such as at least 4 pH units, such as at least 5 pH units.

In a preferred embodiment the particle size distribution of the oil droplets expressed as D[4,3] is between 3 µm and 150 µm, such as between 5 µm and 135 µm, such as between 5 µm and 60 µm.

Example 3 herein describes a method for determining D[4,3]. Other methods may be readily apparent to the skilled person.

The following describe the method for producing a W/O/W multiple emulsions type colorant with at least one water-dispersible coloring agent in the internal aqueous phase by using the components described above.

First, the coloring agent is dissolved in water or an aqueous solution. A W/O emulsion is prepared for the oil component and the water or the aqueous solution containing the pigment. In this preparation of the W/O emulsion, the oil-soluble emulsifier is added to and dissolved in the oil component to make oil phase, and a predetermined amount of the aqueous phase containing the pigment is added to the oil phase. The mixture is agitated, usually in a high-shear device, for a specific period of time so the oil phase forms continuous phase (i.e. dispersion medium), in which the aqueous phase is dispersed resulting in the formation of the W/O emulsion.

Then this W/O emulsion is slowly added to an aqueous solution prepared by dissolving water-soluble emulsifier in water and processed, usually in a low-shear device, to form a W/O/W multiple emulsion.

The W/O/W multiple emulsion prepared according to this process is shown in FIG. 1, in which the W/O/W emulsion consist of W/O emulsion as a dispersed phase having internal water phase 1 dispersed in oil phase 2, and external water phase 3 as a dispersion medium.

The optimal period of time required for shearing in preparing the W/O/W emulsion varies depending on the emulsification equipment used.

A third aspect of the present invention relates to a method for preparing the W/O/W multiple emulsion type colorant according to the first or second aspect of the invention, the method comprising the steps;
a) mixing the at least one water-dispersible natural coloring agent with water to form a first aqueous solution,
b) mixing an oil component with the suitable oil-soluble emulsifier to form an oil solution,
c) mixing a second aqueous solution with the suitable water-soluble emulsifier to form a second aqueous solution,
d) mixing or homogenizing the first aqueous solution and the oil solution together to create a water-in-oil (W/O) emulsion, and
e) mixing or homogenizing the W/O emulsion with the second aqueous solution to create the W/O/W multiple emulsion type colorant.

The W/O/W multiple emulsion type colorant may be used for coloring products, such as cosmetics and edible products including food- and feedstuff as well as pharmaceuticals.

Accordingly, a fourth aspect of the present invention relates to a method for coloring edible products, such as food- and feedstuffs and pharmaceutical products.

The method for coloring edible products comprises providing the edible product and incorporating into the edible product the W/O/W multiple emulsion type colorant prepared according to the invention.

The colorant may be incorporated into the edible product by any conventional method known in the art such as stirring or mixing the colorant into the edible product or an ingredient of the edible product. The edible product may also be colored by e.g. spraying the W/O/W multiple emulsion type colorant onto the edible product or an ingredient of the edible product.

A fifth aspect of the present invention relates to a food composition comprising the W/O/W multiple emulsion type colorant according to the first or second aspect of the invention.

A sixth aspect of the present invention relates to a beverage composition comprising the W/O/W multiple emulsion type colorant according to the first or second aspect of the invention.

The W/O/W multiple emulsion type colorant is preferably incorporated into the edible product, such as a food composition or a beverage composition, in such a way that the coloring agent remains in the internal aqueous phase of the W/OW multiple emulsion prior to consumption of the edible product, i.e. the entrapped coloring agent is not released from the multiple emulsion during storage and handling of the edible product.

A seventh aspect of the present invention relates to use of a W/O/W multiple emulsion type colorant comprising at least one water-dispersible coloring agent in the internal aqueous phase for coloring of an edible product.

An eighth aspect of the present invention is directed to use of a W/O/W multiple emulsion type colorant according to the first or second aspect of the invention for coloring of an edible product.

In much preferred embodiments of the seventh and eighth aspect of the present invention the edible product is selected from the group consisting of confectionary, fruit preparation, ice cream and dairy.

The present invention is further illustrated by the following non-limiting examples.

EXAMPLES

Example 1

W/O/W Emulsion with *Spirulina*

In this study, the primary W/O emulsion was prepared by adding an aqueous solution containing a powdered colorant to a polyglycerol polyricinoleate solution in sunflower oil and stirring for 2 min with 7000 rpm using a Silverson L5M high shear mixer. In the second step, the W/O primary emulsion was reemulsified in a Tween 20 solution and stirred for 1 min at 3300 rpm to produce the W/O/W multiple emulsion.

Materials and Methods

The ingredients used were:

Spirulina powder (LinaBlue HGE from DIC Corporation, Tokyo, Japan)

Demineralized Water

Polyglycerol polyricinoleate, PGPR (oil-soluble emulsifier from Danisco)

Sunflower oil

Tween 20 (water-soluble emulsifier from Sigma-Aldrich)

Table 1 shows the composition of the emulsion as well as illustrating the production procedure.

The three liquid phases were prepared independently by mixing until the phases were homogeneous.

The first emulsion (*Spirulina* in oil phase) was prepared at high speed as indicated in Table 1.

The second emulsion was made by emulsifying the first emulsion into the second aqueous phase.

The second emulsion was prepared at lower speed to avoid breaking the inner emulsion.

TABLE 1

Composition of the W/O/W emulsion

| Product | Composition | Description |
|---|---|---|
| First water phase | 1 g spirulina powder<br>85 g demineralized water | Transparent water-soluble phase containing the pigment of interest |
| Oil phase | 68 g sunflower oil<br>2 g polyglycerol polyricinoleate emulsifier | Oil-soluble phase used to encapsulate the first water phase |
| Second water phase | 69 g demineralized water<br>1 g Tween 20 | Water-soluble phase, final outer phase |
| First emulsion (water-in-oil emulsion).<br>Process at 7000 rpm for two minutes using Silverson L5M high shear mixer | 30 g first water phase<br>70 g oil phase | Emulsion W/O product dispersible in oil. |
| Final product (water-in-oil in water emulsion)<br>Process at 3300 rpm for one minute | 30 g first emulsion<br>70 g second water phase | Emulsion W/O/W product dispersible in water. |

Figure 2:
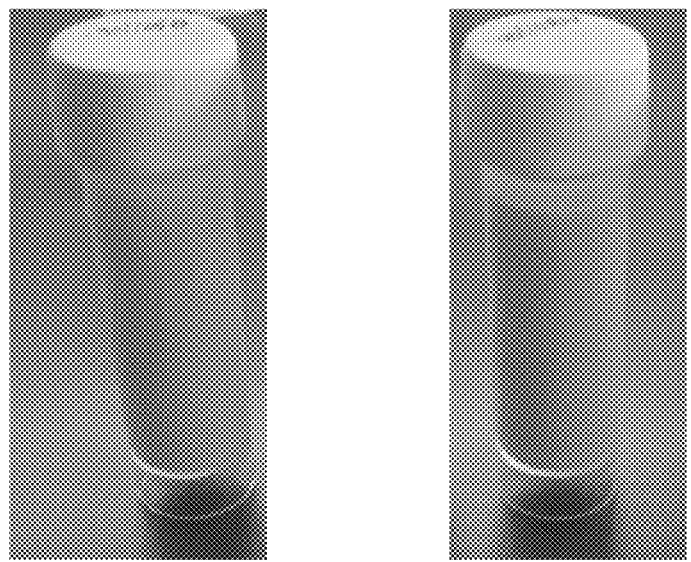
FIG. 2: Emulsions containing phycocyanin from *Spirulina*, after storage at 4° C. for six months. A, First emulsion: Water-in-oil emulsion, 30% w/w aqueous; B, Second emulsion: WOW emulsion: 30% w/w first emulsion.

Polyglycerol polyricinoleate is commonly used in chocolate to improve flow properties. As an alternative, sunflower lecithin could be used as an oil-soluble emulsifier, as well as mono-and-diglycerides. Instead of Tween 20, citrem or sucrose esters could be used. FIG. 2 shows the prepared emulsions containing *spirulina*, after storage at 4° C. for six months.

An important factor is the concentration of colorant in the first aqueous phase. The prepared emulsion had a concentration of 0.10% w/w *spirulina*, which was too low to be useful as a product. A concentration of 5% w/w *spirulina* or more should be achievable in the concentrate. For confectionary products, an example dosage is 0.006% w/w *spirulina* extract in jelly gums a 1% w/w dosage of such a concentrate would be needed, which seems acceptable. Examples are illustrated in Tables 2 and 3.

TABLE 2

Initial Situation with 0.10% spirulina powder in the concentrate (Emulsion D2 in Table 6 of Example 3):

| First water phase | % w/w | Second water phase |
|---|---|---|
| 1 g spirulina powder | 1.163 | 1 g Tween 20 |
| 85 g demineralized water | 98.837 | 69 g demineralized water |
| 86 | 100 | 70 |

| Oil phase | | |
|---|---|---|
| 2 g PGPR emulsifier | | |
| 68 g sunflower oil | | |
| 70 | | |

| First emulsion | | Second emulsion = Final product |
|---|---|---|
| 30 g first water phase | | 30 g first emulsion |
| 70 g oil phase | | 70 g second water phase |
| 100 g first emulsion | | 100 g final product |

| First emulsion detail | % w/w | |
|---|---|---|
| 0.349 g spirulina powder | 0.349 | 0.105 g spirulina powder |
| 29.651 g demineralized water | 29.651 | 8.895 g demineralized water |
| 70 g oil phase | 70 | 21 g oil phase |
| 100 g first emulsion | 100 | 70 g second water phase |
| | | 100 g final product |

TABLE 3

Theoretical Situation with 4.50% spirulina powder in the concentrate (Emulsion D3 in Table 6 of Example 3):

| First water phase | % w/w | Second water phase |
|---|---|---|
| 24 g spirulina powder | 50 | 1 g Tween 20 |
| 24 g demineralized water | 50 | 69 g demineralized water |
| 48 | 100 | 70 |

| Oil phase | | |
|---|---|---|
| 2 g PGPR emulsifier | | |
| 68 g sunflower oil | | |
| 70 | | |

| First emulsion | | Second emulsion = Final product |
|---|---|---|
| 30 g first water phase | | 30 g first emulsion |
| 70 g oil phase | | 70 g second water phase |
| 100 g first emulsion | | 100 g final product |

| First emulsion detail | % w/w | |
|---|---|---|
| 15 g spirulina powder | 15 | 4.5 g spirulina powder |
| 15 g demineralized water | 15 | 4.5 g demineralized water |
| 70 g oil phase | 70 | 21 g oil phase |
| 100 g first emulsion | 100 | 70 g second water phase |
| | | 100 g final product |

Example 2

Test in Confectionery Application

The product produced as described below was tested in hard panning confectionery application using red radish anthocyanins in a colored panning syrup adjusted to pH 5; hard panning with 18 layers Materials and Methods Non-Encapsulated Red Radish Anthocyanins To make the non-encapsulated red radish anthocyanins, an aqueous phase was prepared and mixed in the following proportions:

| Ingredient | Amount per 100 grams Non-Encapsulated red radish anthocyanins |
| --- | --- |
| Red radish powder 50 CU/g (Shanghai Seebio Biotech, Inc.) Strength 50 CU/g | 50 grams |
| Water | 50 grams |

The proportions used for the non-encapsulated red radish anthocyanins were the same as for the internal water phase W1.

Duplex Emulsion with Red Radish Anthocyanins

Water Phase 1 (W1)

An aqueous phase was prepared and mixed in the following proportions:

| Ingredient | Amount per 100 grams Water Phase 1 |
| --- | --- |
| Red radish powder (Shanghai Seebio Biotech, Inc.) Strength 50 CU/g | 50 grams |
| Water | 50 grams |

A red-colored viscous liquid was made, having 25 CU/g, 50.6 degrees brix, and pH 2.3.

Oil Phase (O)

| Ingredient | Amount per 100 grams Oil Phase |
| --- | --- |
| Sunflower oil (Oelmühle Hamburg AG, Hamburg) | 97 grams |
| Polyglycerol polyricinoleate, Danisco (Dupont) Denmark | 3 grams |

The ingredients were mixed together and a water-in-oil emulsion (W1/O) was prepared:

Emulsion 1 (W1/O)

| Ingredient | Amount per 100 grams Emulsion 1 |
| --- | --- |
| Water Phase 1, W1 | 37 grams |
| Oil Phase, O | 63 grams |

Water phase W1 was slowly added into the oil phase with high shear mixing. After all the water phase was added, the whole amount was mixed with Silverson L4R mixer at 8000 rpm for 2 minutes.

Water Phase 2 (W2)

A second aqueous phase was prepared and mixed in the following proportions:

| Ingredient | Amount per 100 grams Water Phase 2 |
| --- | --- |
| Polysorbate 80 (Oleon, Belgium) | 2 grams |
| Water | 98 grams |

Emulsion 2 (W1/O/W2)

| Ingredient | Amount per 100 grams Emulsion 1 |
| --- | --- |
| Emulsion 1 (W1/O) | 30 grams |
| Water phase 2 W2 | 70 grams |

Emulsion 1 (W1/O) was slowly added into the aqueous phase W2 with medium shear mixing. After all of the Emulsion 1 was added, the whole amount was mixed with Silverson L4R mixer at 3000 rpm for 2 minutes.

Color Strength

Raw material strength, red radish powder 50 CU/g

First emulsion=25*0.37=9.25 CU/g

Second emulsion=9.25*0.3=2.775 CU/g (2.5 to 3.0 CU/g)

Application Test

Recipe

Syrup:

| | |
| --- | --- |
| Sucrose | 340.0 g |
| Maltodextrin | 10.0 g |
| Water | 150.0 g |
| Total | 500.0 g |

Polishing:
  Capol® 4820 (Capol, Germany)
  Capol® 425 M (Capol, Germany)
Dragées:
  White chocolate lentils (Flensburger Dragée, Germany)
Procedure
Syrup:
  All the ingredients were mixed in a pan and heated until all the ingredients were completely dissolved.
  Water was added to 500.0 gram (e.g. if weight after cooking was 460 grams, then 40 grams of water was added). The Brix level was adjusted with water to 70.0 (+/−) 0.5.
Panning:
  The colorants were added to the syrup and well mixed into the syrup.
  500 g white centers were filled into a pan (small pan) and the syrup was applied in small portions of 2-2.5 grams (one small spoon full).
  Dried with air at room temperature or slightly warmed air between each layer.
  Numbers of layers were 18.
  The centers were left in a sieve over night.
  Next day, the dragées were polished in the panning machine by applying approx. 1 ml of Capol 4820 (2×½ pipette full—with drying in between) and 1 ml of Capol 425M (½ pipette full).
  The polished product was left in a sieve for half a day to one day.

Application Results

Tables 4A and 4B compare the non-encapsulated red radish anthocyanins with encapsulated red radish anthocyanins.

TABLE 4

Comparison of the non-encapsulated red radish anthocyanins with the W/O/W emulsion with red radish anthocyanins.

Figure 3:
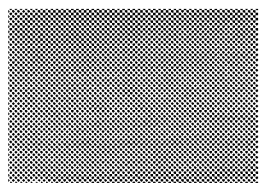
FIG. 3: Photographs of non-encapsulated red radish anthocyanins used for confectionary. A, Syrup colored with non-encapsulated red radish anthocyanins painted onto cardboard; B, Dragées with 18 layers of syrup colored with non-encapsulated red radish anthocyanins.
Figure 3:
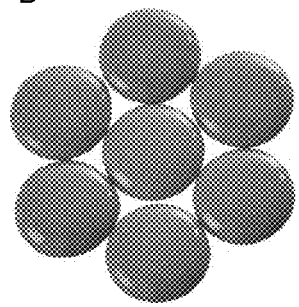
Figure 4:
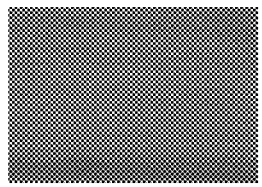
FIG. 4: Photographs of W/O/W emulsion with red radish anthocyanins used for confectionary. A, Syrup colored with encapsulated red radish anthocyanins painted onto cardboard; B, Dragées with 18 layers of syrup colored with encapsulated red radish anthocyanins.
Figure 4:
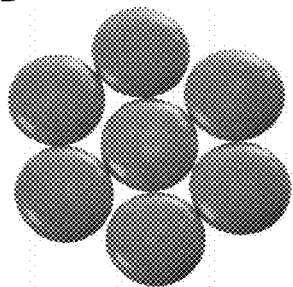

|  | Colored syrup painted onto white cardboard | Picture | Remarks |
|---|---|---|---|
| Red radish anthocyanins solution | FIG. 3A | FIG. 3B | Syrup adjusted to pH 5.0. Red radish powder dissolved in water. No encapsulation. |
| Encapsulated red radish anthocyanins | FIG. 4A | FIG. 4B | Syrup adjusted to pH 5.0. Encapsulated red radish product with low strength. |

|  | pH in colored syrup - adjusted using KOH and (initial after adding color) | Gained weight | Layers |
|---|---|---|---|
| Red radish anthocyanins solution | 4.99 (3.87 initial) | 400.5 g-433.7 g (100 g-108.3 g) | 18 |
| Encapsulated red radish anthocyanins | 5.05 (4.30 initial) | 700.8 g-738.9 g (100 g-105.4 g) | 18 |

The dragées were measured on a Datacolor SF650 D65 10 Deg, using the SAV 9 mm opening.

Five dragées of each type were measured. The results are shown in Table 5 below:

TABLE 5

Tristimulus values of red radish anthocyanins alone and encapsulated red radish anthocyanins compared to skin of red apple.

|  | L-value | a-value | b-value | Chroma | Hue Angle (degrees) |
|---|---|---|---|---|---|
| Red radish anthocyanins alone averages | 55.5 | 42.1 | −2.75 | 42.2 | 356 |
| Encapsulated red radish anthocyanins averages | 54.4 | 54.6 | 12.9 | 56.1 | 13.3 |
| Skin of red apple | 54.2 | 43.1 | 21.7 | 48.3 | 26.7 |

Table Key:
L-value (0 = black/dark; 100 = white/light)
a-value (−60 = Green; +60 = Red)
b-value (−60 = Blue; +60 = Yellow)
Chroma: Low intensity = 0; High intensity = 60
Hue Angle: 0° = red; 90° = yellow; 180° = green; 270° = blue; 360° = red.
Chroma and Hue Angle can be calculated from a* and b* and cover the same information.

Discussion

Table 5 indicates that the encapsulated red radish anthocyanins used to color dragées are in the more red area (the encapsulated product had a higher a-value) and less bluish toned than the red-radish alone (the encapsulated product had a higher b-value).

Visually, the non-encapsulated red radish anthocyanins gave a pinkish color at pH 5 whereas the encapsulated red radish anthocyanins maintained a red color at pH 5 showing that the encapsulated red radish anthocyanins are protected against the higher pH of the environment. Therefore the red color of the anthocyanins at low pH 3 in the internal aqueous phase has been maintained even when used in a confectionery product at pH 5.

Example 3

W/O/W Emulsion Formulations and Measurement of Particle Size Distribution

Table 6 shows the composition of W/O/W emulsions with pigments prepared for application tests. The W/O/W emulsions were prepared in a way analogous to that described in Example 2.

Particle sizes were measured using a Mastersizer 2000 from Malvern Instruments. The Mastersizer 2000 uses the method of laser diffraction and measures droplet size from analyzing the scattering pattern created by the droplets of a sample dispersed in a liquid.

Emulsion samples were dispersed in demineralized water before measuring, and the size distributions were determined using the Fraunhofer theory.

The d[4,3] moment-volume mean is calculated from the measured particle size distribution data using the formula below.

d[4,3] is a characteristic parameter, representing the average diameter in volume:

$$d[4,3] = (\Sigma d_i^4 \phi_i)/(\Sigma d_i^3 \phi_i),$$

where $\phi_i$ is the droplet volume fraction of diameter $d_i$.

The d[4,3] represents the experimental data (unequally-sized particles) by a system of same-sized particles having two characteristics of the original distribution (moment and volume in this case).

TABLE 6

Composition of W/O/W emulsions with different pigments:

|  |  | A | B | C | D1 | D2 | D3 |
|---|---|---|---|---|---|---|---|
|  |  | Elderberry anthocyanins | | | | Spirulina | |
| Internal Aqueous Phase | Water | 80.07 | 80.07 | 80.07 | 60.00 | 98.00 | 50.00 |
|  | Pigment Raw Material | 19.88 | 19.88 | 19.88 | 40.00 | 2.00 | 50.00 |
|  | Citric acid | 0.05 | 0.05 | 0.05 |  |  |  |
| Oil Phase | Oil | 93.00 | 93.00 | 92.87 | 95.00 | 97.00 | 97.00 |
|  | PGPR | 7.00 | 7.00 | 7.13 | 5.00 | 3.00 | 3.00 |
|  | Lecithin |  |  |  |  |  |  |
| External Aqueous Phase | Water | 84.13 | 87.37 | 69.54 | 95.00 | 98.50 | 98.50 |
|  | Hydrophilic emulsifier | 4.56[a] | 2.01[b] | 21.09[c] | 5.00[f] | 1.5[i] | 1.5[i] |
|  | Viscosifier | 0.21[d] | 0.86[e] | 0.18[d] |  |  |  |
|  | Osmotic matcher | 11.10[j] | 9.77[j] | 9.19[j] |  |  |  |
| Emulsion W/O | Internal aqueous phase | 30.26 | 30.67 | 37.17 | 30.00 | 30.00 | 30.00 |
|  | Oil phase | 69.74 | 69.33 | 62.83 | 70.00 | 70.00 | 70.00 |
| Emulsion | Emulsion W/O | 29.79 | 30.08 | 30.08 | 30.00 | 30.00 | 30.00 |

TABLE 6-continued

Composition of W/O/W emulsions with different pigments:

| W/O/W | | | | | | | |
|---|---|---|---|---|---|---|---|
| | External aqueous phase | 70.21 | 69.92 | 69.92 | 70.00 | 70.00 | 70.00 |
| | Final color units | 1.95 | 1.99 | 2.42 | 1.44 | 0.07 | 1.80 |
| | Final % of Pigment Raw Material | 1.80 | 1.80 | 2.20 | 3.60 | 0.18 | 4.50 |
| D[4, 3] (μm) | | 11.130 | 31.693 | 13.373 | 57.03 | N/A | N/A |

| | | E | F | G | H | I | J Carminic Acid | K Black-currant anthocyanins |
|---|---|---|---|---|---|---|---|---|
| | | | | Red radish anthocyanins | | | | |
| Internal Aqueous Phase | Water | 50.15 | 60.00 | 50 | 50 | 50 | 92 | 80 |
| | Pigment Raw Material | 49.85 | 40.00 | 50 | 50 | 50 | 8 | 20 |
| | Citric acid | 0.04 | | | | | | |
| Oil Phase | Oil | 93.00 | 95 | 95 | 95 | 95 | 95 | 95 |
| | PGPR | 7.00 | 5.00 | 5 | 5 | 5 | 5 | 5 |
| | Lecithin | | | | | | | |
| External Aqueous Phase | Water | 95.02 | 98.00 | 54 | 95.00 | 25 | 95.00 | 95.00 |
| | Hydrophilic emulsifier | 4.99[f] | 2.00[f] | 23[g] | 5.00[h] | 5.00[a] | 5.00[f] | 5.00[f] |
| | Viscosifier | | | 23[k] | | 50[k] | | |
| | Osmotic matcher | | | | | 20[n] | | |
| Emulsion W/O | Internal aqueous phase | 40.33 | 37.00 | 22 | 37.00 | 30 | 30.00 | 30.00 |
| | Oil phase | 59.67 | 63.00 | 78 | 63.00 | 70 | 70.00 | 70.00 |
| Emulsion W/O/W | Emulsion W/O | 39.55 | 30.00 | 32 | 30.00 | 30 | 30.00 | 30.00 |
| | External aqueous phase | 60.45 | 70.00 | 68 | 70.00 | 70 | 70.00 | 70.00 |
| | Final color units | 4.24 | 2.22 | 1.76 | 2.78 | 2.25 | 0.72 | 1.80 |
| | Final % of Pigment Raw Material | 8.00 | 4.44 | 3.52 | 5.55 | 4.5 | 0.72 | 1.80 |
| D[4, 3] (μm) | | 43.264 | 43.64 | 5.86 | 13.57 | 41.17 | 46.41 | N/A |

| | | L Calcium Carbonate | M Huito | N Carthamus |
|---|---|---|---|---|
| Internal Aqueous Phase | Water | 50 | 66.7 | 90[l] |
| | Pigment Raw Material | 50 | 33.3 | 10 |
| | Citric acid | | | |
| Oil Phase | Oil | 95 | 95 | 83.00 |
| | PGPR | 5 | 5 | 4.40 |
| | Lecithin | | | 12.6 |
| External Aqueous Phase | Water | 95.00 | 95.00 | 95.00 |
| | Hydrophilic emulsifier | 5.00[f] | 5.00[f] | 5.00[f] |
| | Viscosifier | | | |
| | Osmotic matcher | | | |
| Emulsion W/O | Internal aqueous phase | 30.00 | 30.00 | 23.00 |
| | Oil phase | 70.00 | 70.00 | 77.00 |
| Emulsion W/O/W | Emulsion W/O | 30.00 | 30.00 | 30.00 |
| | External aqueous phase | 70.00 | 70.00 | 70.00 |
| | Final color units | 4.50 | 3.00 | 0.69 |
| | Final % of Pigment Raw Material | 3.83 | | 0.69 |
| D[4, 3] (μm) | | 134.00 | 58.55 | 33.78 |

Table Key:
[a] = Calcium caseinate;
[b] = Citrem N12-Veg ®;
[c] = Purity gum
[d] = xanthan gum;
[e] = CarboxyMethylCellulose
[f] = Polysorbate 80;
[g] = gum arabic Eficacia XE Gum from Colloides Naturels Int;
[h] = sucrose ester 3.3 g; sunflower lecithin 1.7 g;
[i] = Polysorbate 20 (Tween 20)
[j] = glucose
[k] = glycerol
[n] = sucrose
[l] = contains invert sugar, sucrose, citric acid, lemon juice concentrate The huito powder used herein was a spray-dried powder combined with modified food starch, obtained from Chr. Hansen (Denmark). The calcium carbonate used herein was a modified starch encapsulated calcium carbonate, CapColor White 200 from Chr. Hansen (Denmark). Blackcurrant anthocyanins, *spirulina* and *carthamus* were also obtained from Chr. Hansen (Denmark).

Figure 5:
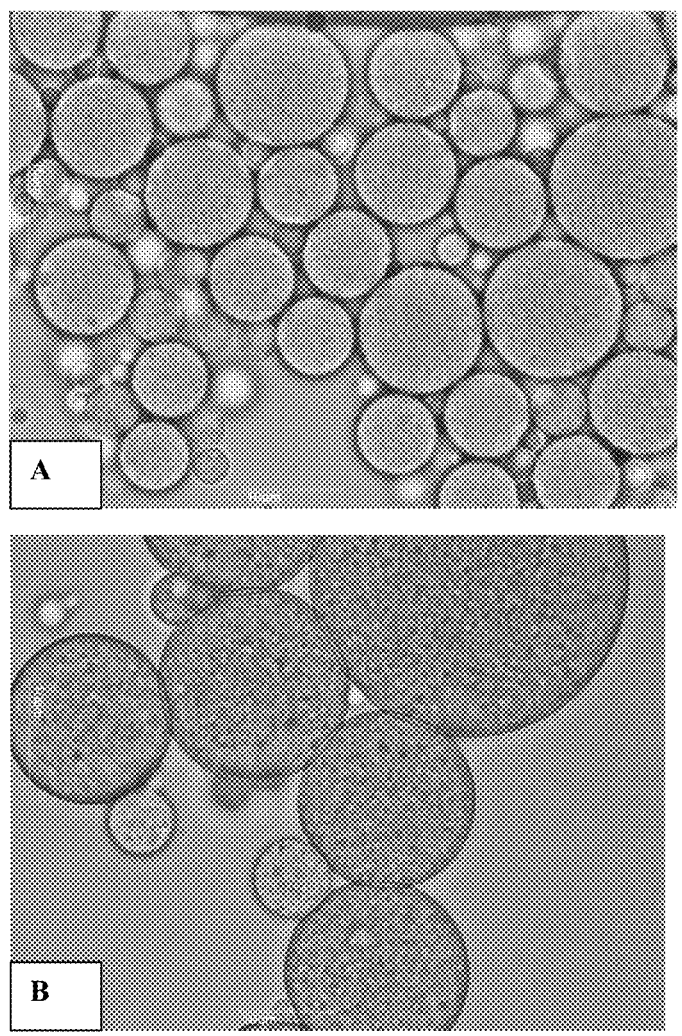
FIG. 5: Photomicrographs of multiple emulsions C (FIG. 5A) and E (FIG. 5B) of Example 3 based on elderberry anthocyanins and red radish anthocyanins, respectively.

Photomicrographs of emulsions C and E of Table 6 show the compartmented structure of the double emulsions with internal water droplets dispersed in fat globules which are dispersed in an aqueous continuous phase (FIG. 5).

Example 4

Stability of W/O/W Emulsion with Anthocyanins Against pH

The protection of multiple emulsions on pigments was put in evidence in different pH conditions.

Materials and Methods

A solution of 0.3M of D(+)Glucose Monohydrate was prepared by adding 31,30 g of D(+)Glucose Monohydrate in 525.51 g of demineralized water (Solution 1). In parallel, 19.34 g of red radish anthocyanins was dissolved in 222.49 g of demineralized water, in order to obtain a solution of 8% wt. red radish anthocyanins (Solution 2, at the same red radish anthocyanins ratio as W/O/W emulsion E of Example 3) with pH 2.5. The aim being to compare the impact of encapsulation on the same quantity of pigment, two other solutions were prepared: one with 0.54 wt. % of solution 2 stirred in solution 1, the other one with 0.54 wt. % of the W/O/W emulsion E of Example 3 (at 8 wt. % of red radish anthocyanins) stirred in solution 1.

Each solution was divided in three batches, where the pH of the external aqueous phase was adjusted to 3.8, 5 and 7, respectively (adding HCl 1M or NaOH 1M, if necessary). Spectrophotometric measurements were performed on Datacolor 450 spectrophotometer.

Results

Figure 6:
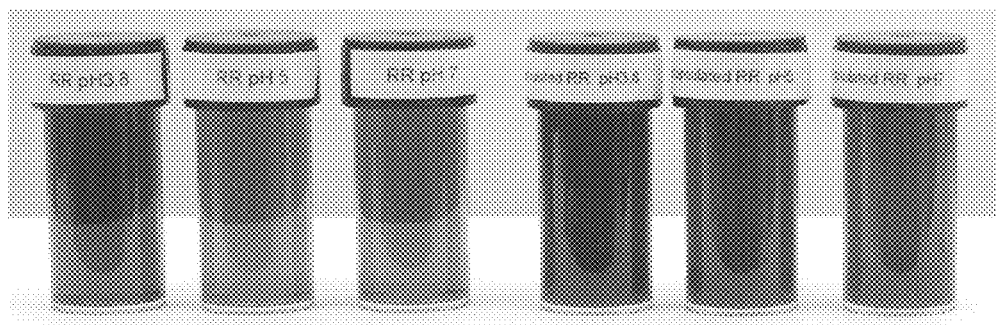
FIG. 6: Encapsulation efficiency of red radish (RR) anthocyanins at pH 3.8, 5 and 7.

Non-encapsulated red radish anthocyanins was unstable when the pH of the continuous phase is higher than 4. Indeed, a color change was clearly observed (FIG. 6) with a red shade at pH 3.8, a pink one at pH 5 and a purple one at pH 7. This instability was slowed down after encapsulation in multiple emulsions (FIG. 6). The spectrophotometric measurements in Table 7 showed an important increase of Δ2000 as a function of pH of the continuous phase for non-encapsulated red radish anthocyanins, whereas for encapsulated red radish anthocyanins Δ2000 was lower than 1, even at pH 7. The hue value evolved significantly for non-encapsulated species from pH 3.8 to pH 7, and stayed constant for encapsulated ones.

Discussion

The protection of red radish pigments by multiple emulsions was demonstrated in this experiment. Without wishing to be bound by theory it is thought that the migration of protons from the continuous phase to the anthocyanins was slowed down thanks to the oil layer surrounding the pigments. Indeed, the encapsulation of the anthocyanins reduced their instability and their color changes significantly resulting in a red shade at pH higher than 4.

TABLE 7

L, C, h measurements of solutions containing encapsulated and non-encapsulated red radish anthocyanins at different pH of the continuous aqueous phase.

|  | pH | L | C | H | Δ2000 |
|---|---|---|---|---|---|
| Red radish anthocyanins alone | 3.8 | 27.62 | 64.73 | 38.38 | — |
|  | 5 | 25.86 | 49.26 | 6.25 | 18.9 |
|  | 7 | 17.33 | 45.3 | 348.10 | 26.02 |
| Encapsulated red radish anthocyanins | 3.8 | 16.45 | 40.59 | 29.49 | — |
|  | 5 | 17.5 | 40.67 | 29.49 | 0.71 |
|  | 7 | 17.14 | 41.08 | 29.88 | 0.53 |

Example 5

Stability Against Migration in FruitPreparation

The migrations of encapsulated and non-encapsulated pigments from slurry to yoghurt were tested below. Red radish anthocyanins and elderberry anthocyanins were used as pigments.

Materials and Methods

Slurry Preparation:

| Ingredients (% weight): | |
|---|---|
| Water | 75.90% |
| Sugar | 20.00% |
| Starch | 3.00% |
| Pectin | 0.70% |
| Citric Acid powder | 0.22% |
| Potassium sorbate | 0.10% |
| Tricalcium Dicitrate | 0.07% |
| Sodium citrate powder | 0.01% |

A blend was prepared to obtain a starch milk: ¼ of water and the starch were melted together. Then ¾ of sugar and ¾ of water were added in a Stephan cooker. Cooking was started and the mixing baffle was used during all the process. At 40° C., ¼ of sugar, pectin, citric acid, sodium citrate and tricalcium dicitrate were added. At 60° C., the starch milk was added and the blend was heated to 90° C. Temperature was maintained for 1 min. Then, potassium sorbate was added and the temperature maintained for 5 min. the slurry was cooled down until 25-30° C. pH and ° Brix were checked (pH=3.8±0.1, ° Brix=22±2). pH could be adjusted with sodium citrate or citric acid.

Colored Slurry:

Red Radish Anthocyanins

Similarly to Example 4, the slurry was divided in two batches: one with 0.57 wt. % of solution 2, the other one with 0.57 wt. % of the W/O/W emulsion E of Example 3 (at 8 wt. % of red radish anthocyanins). 30 g of each batch were introduced into a container. After 1 hour at 5° C., 70 g of yoghurt (Velouté from Danone) were added on top, in order to see the migration of anthocyanins from the slurry into the yoghurt.

Elderberry Anthocyanins 2.98% wt. of the W/O/W emulsion C of Example 3 was added to slurry. A solution of elderberry anthocyanins at 2.2% wt. in demineralized water (i.e. the same elderberry anthocyanins ratio as in the W/O/W emulsion C of Example 3 and the same pH as the internal aqueous phase of emulsion C) was prepared. 2.98% wt. of this elderberry anthocyanins solution was added in another slurry batch. After one hour at 5° C., yoghurt was added on the top of the two samples, at a ratio yoghurt/slurry equal to 70/30.

Results

Figure 7:
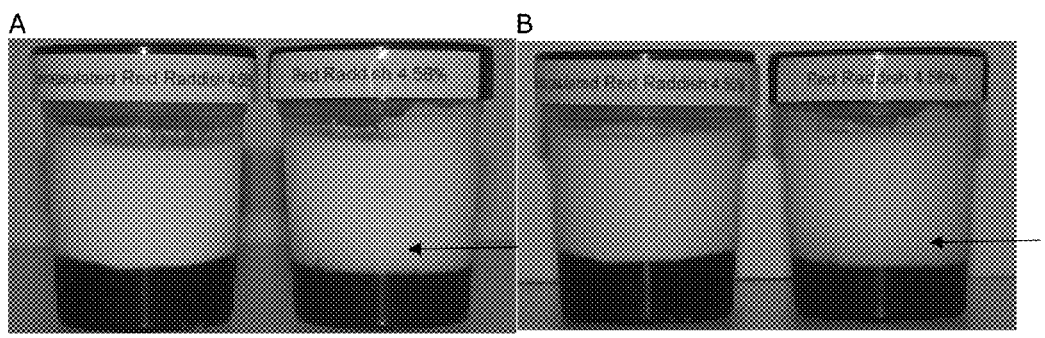
FIG. 7: Migration of red radish anthocyanins alone and encapsulated red radish anthocyanins from slurry into yoghurt after 6 days (A) and after 10 days (B).
Figure 8:
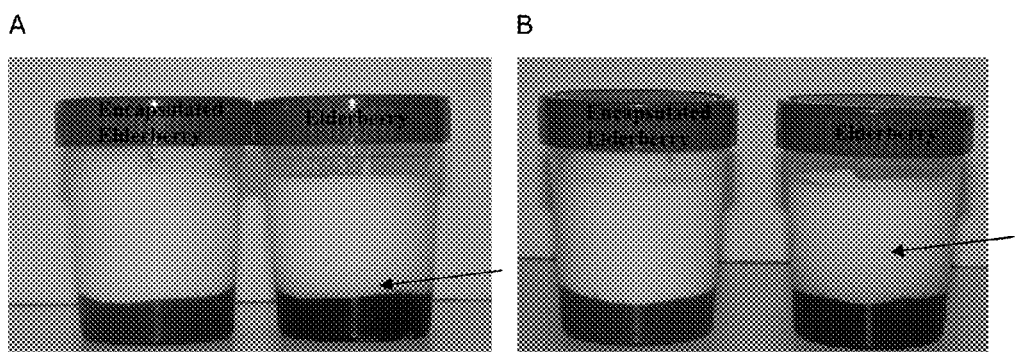
FIG. 8: Migration of elderberry anthocyanins alone and encapsulated elderberry anthocyanins from slurry into yoghurt after 6 days (A) and after 20 days (B).

It appeared clearly (FIG. 7) that encapsulation of red radish pigments by multiple emulsions reduced the migration of the anthocyanins in the yoghurt. After 6 days, a migration of 0.5 cm was observed in yoghurt for non-encapsulated red radish anthocyanins. After 10 days, the migration reached around 0.8 cm, whereas no migration was noticeable for encapsulated Red radish anthocyanins. The same observations were done using elderberry anthocyanins as pigment (FIG. 8). After 6 days, the anthocyanins migrated at around 0.5 cm into the yoghurt, versus 0 cm with multiple emulsions. After 20 days of storage, the anthocyanins migration reached 2 cm compared to no migration with multiple emulsions.

Discussion

Without wishing to be bound by theory it is believed that due to their larger size, the fat globules of the W/O/W emulsions are entrapped in the slurry matrix, which suppresses their migration into the yoghurt, whereas anthocyanins molecules are able to diffuse more easily. Consequently, the multiple emulsions strongly reduce this phenomenon, which significantly reduces the stability of the dairy products.

Example 6

Light Protection of Multiple Emulsions in Jelly

Light protection of pigments encapsulated in multiple emulsions was demonstrated in Jelly application.

Materials and Methods

Similarly to the previous examples, two formulations were performed: one with pigments alone, and the other one with the same quantity of pigments but encapsulated in a multiple emulsion.

21.9% wt. of powder mix and 0.54% wt. of the multiple emulsion E of Example 3 (or 0.54% wt. of the solution 2 prepared in Example 4) were dispersed in tap water while stirring, and then heated to 95° C. The powder mix was composed of 1.4% wt. of potassium citrate, 0.9% wt. of carraghenan and 97.7% wt. of sugar. The temperature was kept at 95° C. for 6 min. Then, the product was cooled to 75° C., and pH was adjusted to pH 4 by addition of citric acid. For each blend, the preparation was stored in a Jelly container and in an Iwaki flask.

After 1 night in cold conditions, samples were placed in a UV Chamber Suntest CPS+ (Energy received: 1390 W/m$^2$) for 4 hours, and L, C, h measurements were done every hour with a DataColor 450 spectrophotometer. The obtained results were summarized in Table 8.

Results

The Δ2000 of samples containing red radish anthocyanins without encapsulation was twice as high as the samples with encapsulated red radish anthocyanins: 3.70 versus 1.82 (Table 8). For both samples, the L value decreased significantly, and the shade became more reddish. Moreover, the light exposition implied an increase in chroma values for both samples.

Discussion

These results clearly demonstrated the impact of multiple emulsions on the light protection of pigments. Indeed, the compartmented structure of these systems slowed down the destruction of encapsulated species.

TABLE 8

L, C, h measurements on Jelly containing red radish anthocyanins alone and encapsulated red radish anthocyanins in multiple emulsion E of Example 3, as function of exposition time in UV Chamber.

|  | Time in UV Chamber Suntest CPS+ | L | C | H | Δ2000 |
|---|---|---|---|---|---|
| Red radish anthocyanins alone in Jelly | 0 h | 29.46 | 50.57 | 32.61 | — |
|  | 1 h | 26.09 | 51.41 | 30.93 | 2.72 |
|  | 2 h | 25.66 | 52.04 | 31.17 | 3.00 |
|  | 3 h | 24.69 | 51.76 | 30.92 | 3.71 |
|  | 4 h | 24.68 | 52.02 | 31.08 | 3.70 |
| Encapsulated Red radish anthocyanins in Jelly | 0 h | 16.83 | 31.03 | 22.35 | — |
|  | 1 h | 14.97 | 32.31 | 21.94 | 1.35 |
|  | 2 h | 14.63 | 32.49 | 21.96 | 1.58 |
|  | 3 h | 14.39 | 32.23 | 21.52 | 1.72 |
|  | 4 h | 14.23 | 32.24 | 21.47 | 1.82 |

Example 7

Test Encapsulated Carminic Acid

The product produced as described below was tested in milk application as a model system for milk drinks and ice cream.

Materials and Methods
Non-Encapsulated Carminic Acid

The aqueous phase was a liquid carminic acid from Chr. Hansen CO-820-WS-AP with pH 1.7 (Range 1.5 to 2.5). It is a dark orange-red liquid produced by extraction of carminic acid from the cochineal insect. The pigment is diluted in propylene glycol and water. The major coloring principle is carminic acid in the range 7.8 to 8.6%.

The usage is for water-ice, confectionery, jams, jellies, beverages and other products with low pH. The product cannot be used in milk products due to precipitation of the carminic acid. The product has an orange to red hue in the final product, depending on the food product, processing, and the quantity used.

Water Phase 1 (W1)

The aqueous phase consisted of the carminic acid from Chr. Hansen as described above.

Oil Phase (O)

| Ingredient | Amount per 100 grams Oil Phase |
|---|---|
| Sunflower oil (Oelmühle Hamburg AG, Hamburg) | 97 grams |
| Polyglycerol polyricinoleate, Danisco (Dupont) Denmark | 3 grams |

The two ingredients were mixed together at room temperature.

Emulsion 1 (W1/O)

| Ingredient | Amount per 100 grams Emulsion 1 |
|---|---|
| Water Phase 1, W1 | 30 grams |
| Oil Phase, 0 | 70 grams |

Water phase W1 was slowly added into the oil phase with high shear mixing. After all the water phase was added, the whole amount was mixed with Silverson L4R mixer at 8000 rpm for 2 minutes.

Water phase 2 (W2)

A second aqueous phase was prepared and mixed in the following proportions:

| Ingredient | Amount per 100 grams Water Phase 2 |
|---|---|
| Polysorbale 80 (Oleon, Belgium) | 5 grams |
| Water | 95 grams |

Emulsion J (W1/O/W2)

| Ingredient | Amount per 100 grams Emulsion 1 |
|---|---|
| Emulsion 1 (W1/O) | 30 grams |
| Water phase 2 W2 | 70 grams |

Emulsion 1 (W1/O) was slowly added into the aqueous phase W2 with medium shear mixing. After all the Emulsion 1 was added, the whole amount was mixed with Silverson L4R mixer at 1000-3000 rpm for 2 minutes.

Theoretical Color Strength

Raw material strength 8% w/w carminic acid.
First emulsion=8*0.30=2.4% w/w
Second emulsion (Emulsion J)=2.4*0.3=0.72% w/w Application Test Medium:
UHT low fat milk, pH 6.4-6.8

Procedure:
- 0.50 grams of carminic acid 8% was added and filled to 100.00 grams with milk. (0.5*8/100=0.040% carminic acid in milk)
- 6.0 grams of Carminic acid 0.72% was added and filled to 100.00 grams with milk (6*0.72/100=0.043% carminic acid in milk).

Application Results

Figure 9:
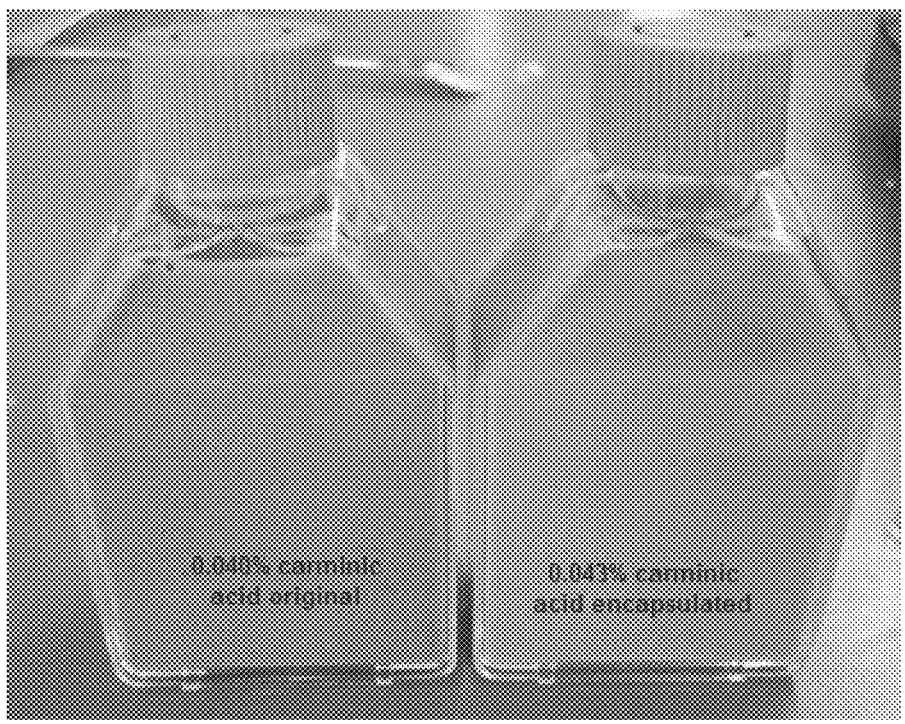
FIG. 9: Comparison of the non-encapsulated carminic acid with encapsulated carminic acid, respectively, in milk.

FIG. 9 compares the non-encapsulated carminic acid with encapsulated carminic acid. The encapsulated carminic acid remained red in color and did not form spots.

Over time, the spots float to the surface of the milk.

The samples were measured on a Datacolor SF650 D65 10 Deg, using the LAV 30 mm opening.

The results are shown in Table 9 below:

TABLE 9

Tristimulus values of carminic acid alone and encapsulated carminic acid

| | L-value | a-value | b-value | Chroma | Hue Angle (degrees) |
|---|---|---|---|---|---|
| Carminic acid liquid 0.040% | 60.1 | 9.81 | −6.52 | 11.8 | 326 |
| Encapsulated carminic acid 0.043% | 67.5 | 28.1 | 6.31 | 28.8 | 12.6 |
| Skin of red apple | 54.2 | 43.1 | 21.7 | 48.3 | 26.7 |

Table Key:
L-value (0 = black/dark; 100 = white/light)
a-value (−60 = Green; +60 = Red)
b-value (−60 = Blue; +60 = Yellow)
Chroma: Low intensity = 0; High intensity = 60
Hue Angle: 0° = red; 90° = yellow; 180° = green; 270° = blue; 360° = red.
Chroma and Hue Angle can be calculated from a* and b* and cover the same information.

Discussion

Table 9 indicates that the encapsulated carminic acid is in the more red area (the encapsulated product had a higher a-value) and less bluish toned than the carminic acid alone (the encapsulated product had a higher b-value) showing that the diffusion of calcium ions from the external to the internal aqueous phase is slowed down by the compartmented structure of the double emulsion. Encapsulation of carminic acid reduces the precipitation of the pigment, protecting it from Ca ions, and allowing a more reddish colour Example 8

Test Encapsulated *Spirulina*

*Spirulina* color has different shades at different pH values. It is most blue at neutral pH, limiting its usage at low pH to form a blue color. In addition, a haze can form. *Spirulina* also has limited light stability and fades quickly.

Materials and Methods

Non-Encapsulated *Spirulina* Powder

An amount of 40 grams of *spirulina* powder was dissolved in 60 grams of water. *Spirulina* powder was used with *spirulina* color 40%, giving a final composition of 16% w/w *spirulina* color in the water solution.

Encapsulated *Spirulina* Powder

The emulsion used was D1 of Example 3. *Spirulina* powder was used with *Spirulina* Color 40%.

Theoretical Color Strength of Encapsulated *Spirulina*

Raw material strength 40% w/w *spirulina* color.
First emulsion=16*0.30=4.8% w/w
Second emulsion (Emulsion D)=4.8*0.3=1.44% w/w Application Test The difference in color was compared at two different pH values, pH 2 and pH 6.

pH 2 Medium:
50 grams citric acid anhydrous
50 g glycose syrup powder
900 g demineralized water
The ingredients were blended.

pH 6 Medium:
50 g glycose syrup powder
950 g demineralized water
The ingredients were blended.

Procedure
- 0.50 grams of non-encapsulated *spirulina* powder was added to a beaker and filled to 100.0 grams with pH 2 medium or pH 6 medium. (16%*0.5/100=0.080 *spirulina* color in liquid)
- 6.0 grams of encapsulated *spirulina* powder was added to a beaker and filled to 100.0 grams with pH 2 medium or pH 6 medium. (1.44%*6/100=0.086% *spirulina* color in liquid).

Application Results

Samples were poured into Iwaki flasks and measured in reflection measurements on a Datacolor instrument SF650 D65 10 Deg, using the LAV 30 mm opening. Samples were measured after 0 and 60 minutes.

TABLE 10

*Spirulina* samples according to recipe D at 0.08% *spirulina* color in pH 2 medium or pH 6 medium.
Original data table

| Name | pH | Sample | Time | L* | a* | b* | C* | H* |
|---|---|---|---|---|---|---|---|---|
| Spirulina-2-0 | 2 | Original | 0 | 44.42 | −27.16 | −12.95 | 30.08 | 205.49 |
| Spirulina-6-0 | 6 | Original | 0 | 36.35 | 2.44 | −28.07 | 28.18 | 274.98 |
| DS-2-0 | 2 | Multiple emulsion | 0 | 55.16 | −10.09 | −27.98 | 29.75 | 250.17 |
| DS-6-0 | 6 | Multiple emulsion | 0 | 57.69 | −8.35 | −29.76 | 30.91 | 254.32 |
| Spirulina-2-60 | 2 | Original | 60 | 44.31 | −27.44 | −12.04 | 29.96 | 203.70 |
| Spirulina-6-60 | 6 | Original | 60 | 36.32 | 2.41 | −28.11 | 28.21 | 274.91 |
| DS-2-60 | 2 | Multiple emulsion | 60 | 53.52 | −12.05 | −23.03 | 25.99 | 242.38 |

TABLE 10-continued

Spirulina samples according to recipe D at 0.08%
spirulina color in pH 2 medium or pH 6 medium.
Original data table

| Name | pH | Sample | Time | L* | a* | b* | C* | H* |
|---|---|---|---|---|---|---|---|---|
| DS-6-60 | 6 | Multiple emulsion | 60 | 57.01 | −8.10 | −29.81 | 30.89 | 254.79 |

Table Key:
L-value (0 = black/dark; 100 = white/light)
a-value (−60 = Green; +60 = Red)
b-value (−60 = Blue; +60 = Yellow)
Chroma: Low intensity = 0; High intensity = 60
Hue Angle: 0° = red; 90° = yellow; 180° = green; 270° = blue; 360° = red.
Chroma and Hue Angle can be calculated from a* and b* and cover the same information.

Results and Discussion

Figure 10:
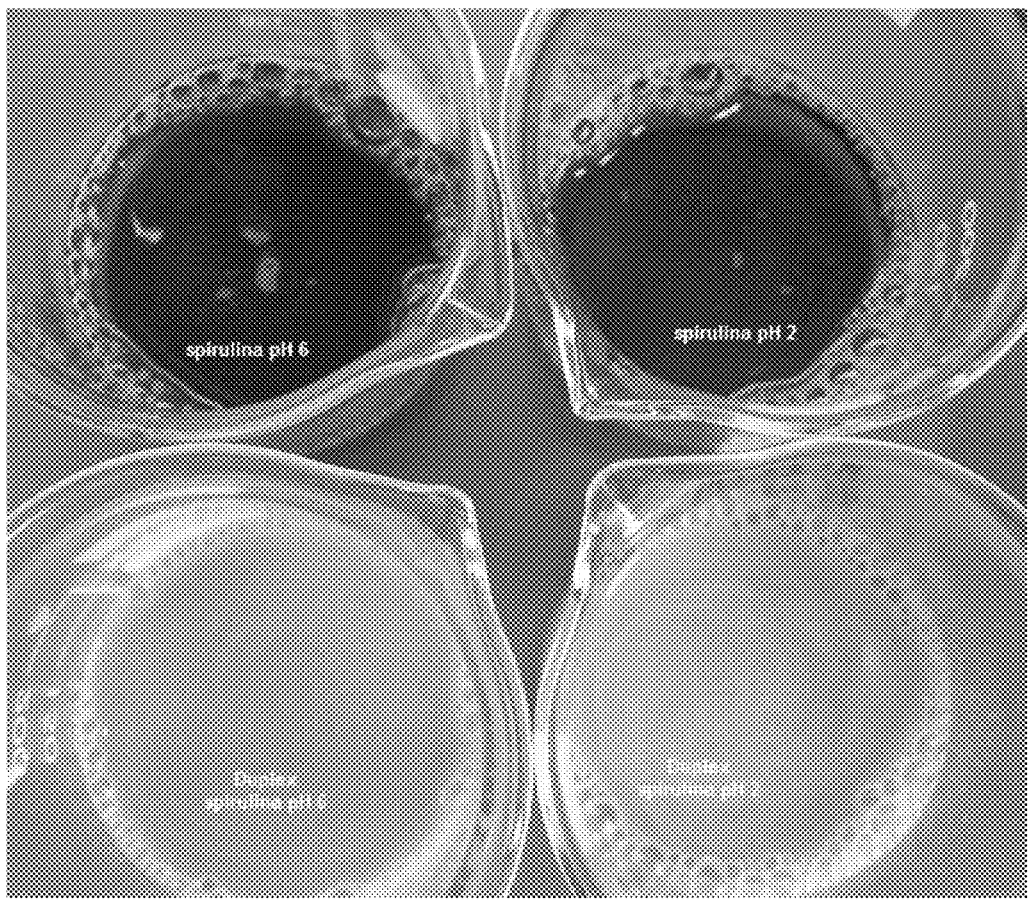
FIG. 10: Effect of encapsulation of phycocyanin in W/O/W emulsion. *Spirulina*: non-encapsulated phycocyanin. Duplex *spirulina*: W/O/W emulsion with phycocyanin.

When added to an aqueous solution at pH 6, non-encapsulated *spirulina* gave a bright blue transparent color. Adding non-encapsulated *spirulina* to a low pH solution (pH 2) gave a green color instead. On the other hand the encapsulated *spirulina* looked quite similar when dispersed at either pH 2 or pH 6. FIG. 10 shows photos of these effects.

Figure 11:
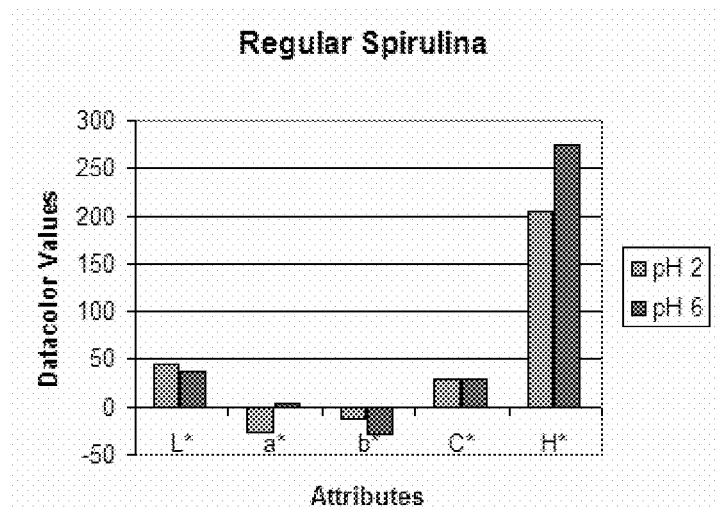
FIG. 11: Effect of pH for non-encapsulated phycocyanin (Regular *Spirulina*).
Figure 12:
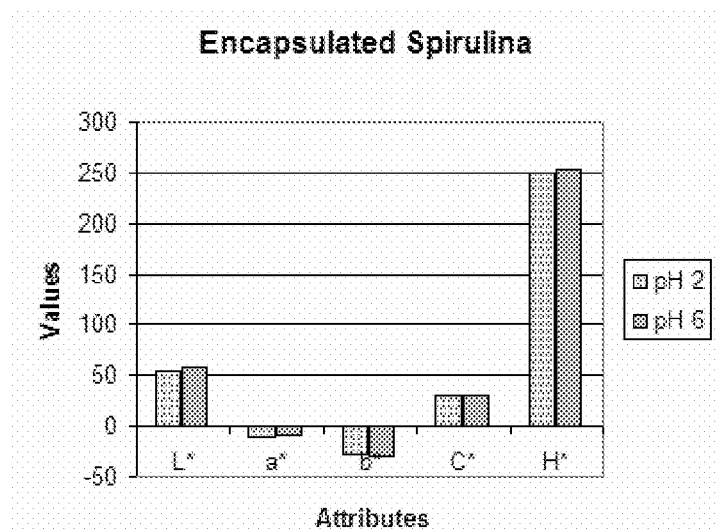
FIG. 12: Effect of pH for W/O/W emulsion with phycocyanin (Encapsulated *Spirulina*).

Table 11 compares the regular *spirulina* values at pH 2 and pH 6, while Table 12 does the same for the encapsulated *spirulina*. With time, a lot of sediment and precipitation was seen in the regular *spirulina* at pH 6; some precipitates were also observed at pH 2. These precipitates were not observed for the encapsulated *spirulina*. FIGS. 11 and 12 show graphs of the values.

These results show that the effects of a pH change is reduced when using a multiple emulsion for encapsulation of the *spirulina*.

TABLE 11

Tristimulus values for regular spirulina.
Regular spirulina (value at pH 2 minus value at pH 6)

| Values | pH 2 | pH 6 | Difference | Description |
|---|---|---|---|---|
| L* | 44.42 | 36.35 | 8.07 | Similar L-values (pH 2 slightly darker). |
| a* | −27.16 | 2.44 | −29.6 | High negative a-value means pH 2 much more green than pH 6. |
| b* | −12.95 | −28.07 | 15.12 | High negative b-value means pH 6 much more blue than pH 2. |
| C* | 30.08 | 28.18 | 1.9 | Overall brightness was the same for both samples. |
| H* | 205.49 | 274.98 | −69.49 | pH 6 is more blue, with hue angle close to 270 Degrees |

TABLE 12

Tristimulus values for encapsulated spirulina.
Encapsulated spirulina (value at pH 2 minus value at pH 6)

| Values | pH 2 | pH 6 | Difference | Description |
|---|---|---|---|---|
| L* | 55.16 | 57.69 | −2.53 | Similar L-values |
| a* | −10.09 | −8.35 | −1.74 | Similar a-values (pH 2 more green) |
| b* | −27.98 | −29.76 | 1.78 | Similar b-values (pH 6 more blue) |
| C* | 29.75 | 30.91 | −1.16 | Overall brightness was the same for both samples. |
| H* | 250.17 | 254.32 | −4.15 | Similar hue angle (pH 6 more blue) |

REFERENCES

Horst, B. M. van der, and Langelaan, H. C. (1999). Voedingsmiddelentechnologie 32(24): 10-16.
U.S. Pat. No. 4,254,105 (Fukuda)
International Patent Appl. No. WO 2008/021531 (University of Massachusetts).
US Patent Appl. No. 2010/0099639 (Terao et al.)
Rodriquez-Huezo et al. (2004). J Food Science 69(7): E351-E359.
JP 62244370 (Sanei Kagaku Kogyo KK).
JP60034155 (Hasegawa T Co Ltd).

The invention claimed is:

1. A method for protecting a water-soluble or water-dispersible natural coloring agent against changes in pH, comprising formulating the natural coloring agent in a water-in-oil-in-water (W/O/W) emulsion comprising an internal aqueous phase, an oil phase, and an external aqueous phase, such that the natural coloring agent is located in the internal aqueous phase of the W/O/W emulsion and is protected from changes in pH outside of the W/O/W emulsion, wherein the pH gradient between the internal aqueous phase and the external aqueous phase is at least 2.0.

2. The method of claim 1, wherein the coloring agent is selected from the group consisting of carmine, *carthamus*, huito, calcium carbonate, Cu-chlorophyllin, red beet betalains, caramel, carbo vegetabilis and annatto.

3. The method of claim 1, wherein the coloring agent is selected from the group consisting of phycocyanin, carminic acid and anthocyanins.

4. The method of claim 1, wherein the coloring agent is an anthocyanin selected from the group consisting of aronia anthocyanins, bilberry anthocyanins, black carrot anthocyanins, blackcurrant anthocyanins, cherry anthocyanins, elderberry anthocyanins, hibiscus anthocyanins, lingonberry anthocyanins, purple corn anthocyanins, red grape anthocyanins, red radish anthocyanins, and sweet potato anthocyanins.

5. The method of claim 1, wherein the W/O/W emulsion comprises:
   (a) an internal aqueous phase comprising the coloring agent;
   (b) an oil phase comprising an oil-soluble emulsifier; and
   (c) an external aqueous phase comprising a water-soluble emulsifier.

6. The method of claim 5, wherein the pH of the internal aqueous phase is no more than 6.0.

7. The method of claim 1, wherein the formulating method comprises:

(a) mixing the coloring agent with water to form a first aqueous solution;
(b) mixing an oil component with a suitable oil-soluble emulsifier to form an oil solution;
(c) mixing a second aqueous solution with a suitable water-soluble emulsifier to form a second aqueous solution;
(d) mixing or homogenizing the first aqueous solution and the oil solution together to create a water-in-oil (W/O) emulsion; and
(e) mixing or homogenizing the W/O emulsion with the second aqueous solution to create the W/O/W emulsion comprising the coloring agent.

8. The method of claim 1, wherein the internal aqueous phase of the W/O/W emulsion comprises water droplets having a particle size range of from 10 nm to 20 µm.

9. The method of claim 8, wherein the water droplets have a particle size range of from 100 nm to 5 µm.

10. The method of claim 1, wherein the W/O/W emulsion comprises oil droplets having a particle size range of from 3 µm to 150 µm, expressed as d[4,3].

11. The method of claim 10, wherein the oil droplets have a particle size range of from 5 µm to 135 µm.

12. The method of claim 10, wherein the oil droplets have a particle size range of from 5 µm to 60 µm.

13. The method of claim 1, further comprising incorporating the W/O/W emulsion comprising the protected natural coloring agent into an edible product.

14. The method of claim 13, wherein the edible product is selected from the group consisting of a confectionary, a fruit preparation and ice cream.

* * * * *